United States Patent Office 2,824,488
Patented Feb. 25, 1958

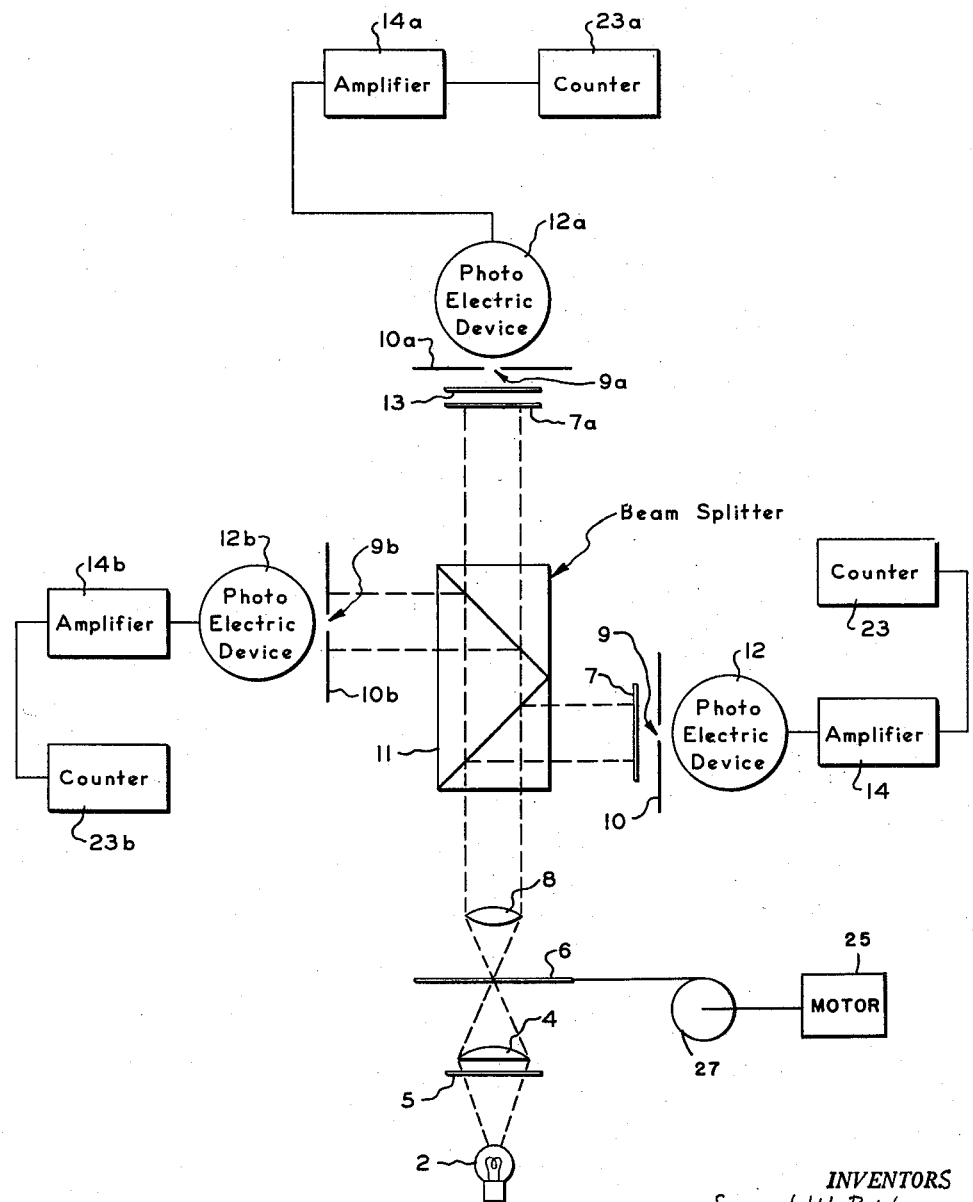

2,824,488
APPARATUS FOR GRADING FIBERS

Samuel W. Bridges, Wellesley, and Jonathan R. Roehrig, South Sudbury, Mass., assignors to National Research Corporation, Cambridge, Mass., a corporation of Massachusetts Application August 25, 1954, Serial No. 452,016

3 Claims. (Cl. 88—14)

This invention relates to measuring and in particular to the measuring of fibers.

A principal object of the invention is to provide an improved apparatus for determining the percentage of different types of fibers contained in a mixture of fibers.

Another object of the invention is to provide an apparatus of the above type which is particularly adapted to distinguishing between various types of textile fibers.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a diagrammatic illustration of one preferred embodiment of the present invention.

Throughout the various textile industries, stringent standards have been established so as to result in a uniform basis upon which fibers may be graded or classified. The measurements of the average diameter and diameter distribution of fibers are among the most important characteristics in determining the grade or fineness of fibers on which the ultimate price and end use of the fibers largely depend. In the copending applications of Lawrence et al., Serial No. 399,011, filed December 18, 1953, and Roehrig, Serial No. 452,015, filed on even date herewith, there are described several embodiments of apparatus which has been found successful in measuring the average diameter and diameter distribution of fibers.

As described in the aforementioned copending applications, it has been shown that the desired fiber measurements can be obtained by optically scanning groups of short sectioned fibers which have been aligned in a substantially parallel manner in the focal plane of a suitable optical scanning system. This optical scanning system preferably comprises a source of light, a lens system for forming a beam of light, a transparent support for holding the fibers to be scanned, and a photoelectric device responsive to changes in illumination. A group of fibers can be aligned by placing the fibers on a suitable grating and then picking these fibers from the grating by means of pressure-sensitive adhesive tape which will maintain the fiber alignment. The pressure-sensitive adhesive tape can then be secured to a microscope slide and passed through the optical system. The image of the fibers moving at a constant rate in a direction transverse of the fiber length is projected on the photoelectric device so as to produce electrical signals or pulses which bear a direct relationship to the diameter of the fibers scanned. These electrical signals containing width information are then fed to suitable counting circuits.

The present invention is directed to a modification of equipment of the above type which is specifically designed for determining relative percentages of different types of fibers in a given group of fibers. The invention is based on the discovery that many fibers exhibit significant optical anisotropy such that, for example, a plane polarized light beam incident on the fiber in a direction other than parallel to the longitudinal axis of the fiber and having its plane of polarization at an angle other than 0° or 90° with respect to the longitudinal axis of the fiber will be converted to elliptically polarized light by passing through the fiber. The polarized light passing through the fibers (aligned in a substantially parallel relationship) is thus appreciably elliptically polarized by those fibers which are optically anisotropic. The degree of anisotropy of the various fibers is a function of the type of fiber and can, with certain artificial fibers, depend to a certain extent on the method of manufacture. By utilizing suitable polarizers (supplemented in some cases by color filters) for examining the light beam which is passed through a given fiber, its optical anisotropy can be readily detected. When the optical anisotropy of the fiber is a function of wave length of the light, the color of the light beam which has passed through the fiber can be employed to give a further indication as to the type of fiber under illumination.

The present invention will be particularly described in connection with an apparatus designed specifically for analyzing figers to obtain an indication of the percentage of different types in a group. This type-distribution measurement can be in addition to, or in lieu of, a diameter-distribution measurement of the type described in the aforementioned applications of Lawrence et al. and Roehrig. In order to distinguish between different types of fibers, the apparatus preferably comprises an optical system comprising a light source 2, a polarizing filter 5, a condensing lens 4, a transparent slide 6 for carrying fibers in substantially parallel alignment, means for moving said slide consisting of a wheel or gear 27 and a constant speed motor 25, and a projection system 8 shown as a single lens. The light emanating from the projection system is preferably fed to a beam splitter 11 which separates the light into three or more separate beams, one of which goes to an electro-optical system which preferably comprises a polarizing filter 7, a slit 9 in a shield 10, a photoelectric cell 12, an amplifier 14 and a counter 23. This much of the apparatus, excluding the beam splitter 11, is made in the manner more fully described and claimed in the above mentioned application of Roehrig, filed on even date herewith. The second light beam goes to a second electro-optical system which comprises a polarizing filter 7a, a light filter 13, a slit 9a in a shield 10a, a photoelectric cell 12a, an amplifier 14a and a counter 23a. The purpose of the color filter 13 is to differentiate between fibers whose optical anisotropy is a function of wave length. For example, in one embodiment of the invention, the filter 13 is minus-red so that it will block red light. Since nylon fibers appear red when placed between crossed polarizing filters, images of these fibers will be blocked by filter 13 and the counter 23a will count only the white images corresponding to the wool fibers. Thus the counter 23 will count the total of nylon fibers and wool fibers while counter 23a will count only the wool fibers. The difference between these two counts will thus give the number of nylon fibers in the sample. The third electro-optical system preferably includes neither a polarizing filter nor a color filter but does have the corresponding slit 9b in the shield 10b, the photoelectric device 12b, the amplifier 14b and the counter 23b. Accordingly, it will count all fibers scanned by the optical system. Equally, although not indicated in the drawing, the third electro-optical system (9b, etc.) can include any suitable arrangement of one or more color filters to distinguish between various types of fibers. Thus, for example, when various fibers have different transmissions for different wave lengths of visible, ultraviolet or infrared light, such differences in light transmission can be employed to distinguish between fibers having no optical anisotropy or having substantially constant optical anisotropy over the wave length range.

When employing the illustrated device, the sample to be analyzed is suitably prepared (as mentioned previously) and mounted on the transparent slide 6 so as to be scanned by the optical system. The resultant image is then split by the beam splitter 11 and transmitted to the three or more electro-optical systems. The first counter 23 will give a total count of all of those fibers which are sufficiently optically anisotropic to elliptically modify the plane of polarization enough so that the light passes through the polarizing filter 7. The second counter 23a will count the same fibers as the counter 23 minus those fibers whose optical properties are such that the resultant light approaching the electro-optical system is red in color. Thus, even though the light passes the polarizing filter 7a, it is still blocked by the minus-red filter 13. Counter 23b will count all of the fibers. The various counters 23, 23a, 23b, etc., can be arranged to give (in addition to total count) a breakdown by size distribution, as described in complete detail in the above mentioned copending application of Lawrence et al. Equally, the counters can be interconnected so as to give a fiber count by optical characteristic. Thus, for example, the counter circuit can be arranged so that signals from counter 23a are automatically deducted from signals approaching counter 23 so that counter 23 will give only the wool count. Additionally, the signals from counters 23 and 23a can be deducted from the signals approaching counter 23b so that counter 23b gives only the total of optically isotropic fibers. As mentioned previously, the optically isotropic fibers can, if desired, be further analyzed by suitable color filters.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. Apparatus for grading fibers as a function of their optical properties, said apparatus comprising means for generating a beam of polarized light, means for holding a number of the fibers to be graded in substantially parallel relationship and in the focal plane of an optical system illuminated by said beam of polarized light, means for moving said holding means with respect to the polarized light beam so as to modify said polarized light beam by the optical property of each fiber in sequence, means for splitting the modified light beam into two light beams, the first of said beams being directed to a first electro-optical system and the second of said beams being directed to a second electro-optical system, a polarizing filter positioned adjacent the first electro-optical system for substantially preventing said first polarized beam from reaching said first electro-optical system unless said first polarized light beam has been modified by an optically anisotropic fiber, a color filter positioned adjacent the second electro-optical system for blocking light approaching said electro-optical system and having a predetermined color, and counting means controlled by said electro-optical systems for indicating the number of fibers detected by each of said two electro-optical systems.

2. Apparatus for grading fibers as a function of their optical properties, said apparatus comprising means for generating a beam of light, means for holding a number of fibers to be graded in substantially parallel relationship and in the focal plane of an optical system illuminated by said beam of light, means for moving said holding means with respect to the light beam so as to modify said light beam by the optical property of each fiber in sequence, means for splitting the modified light beam into two light beams, the first of said beams being directed to a first electro-optical system and the second of said beams being directed to the second electro-optical system, a filter positioned adjacent the first electro-optical system for substantially preventing said first beam from reaching said first electro-optical system when said first light beam has been modified by a fiber of a given color, a second color filter positioned adjacent the second electro-optical system for blocking light approaching said electro-optical system and having a second color, and counting means controlled by said electro-optical systems for indicating the number of fibers detected by each of said two electro-optical systems.

3. Apparatus for grading textile fibers comprising an optical system for projecting a beam of polarized light, means for holding a number of fibers in substantially parallel relationship in the beam of polarized light, means for creating relative motion transversely of the fiber length between the holding means and the light beam, a beam splitter for splitting said light beam into several portions, a plurality of electro-optical systems positioned to receive portions of the split beam, and counting means controlled by said electro-optical systems, two of said electro-optical systems including polarizing filters arranged to block portions of the polarized beam which have not passed through an anisotropic fiber, one of said two electro-optical systems additionally including a color filter for blocking light of a predetermined color, and a third electro-optical system arranged to detect optically isotropic as well as optically anisotropic fibers.

References Cited in the file of this patent

UNITED STATES PATENTS

| | | |
|---|---|---|
| 2,037,044 | Reinartz et al. | Apr. 14, 1936 |
| 2,299,983 | Hertel | Oct. 27, 1942 |
| 2,332,308 | Dresser | Oct. 19, 1943 |
| 2,413,486 | Denyssen | Dec. 31, 1946 |
| 2,509,068 | McMahon | May 23, 1950 |

FOREIGN PATENTS

| | | |
|---|---|---|
| 731,095 | Germany | Feb. 1, 1943 |